United States Patent [19]
Scholz et al.

[11] Patent Number: 5,292,290
[45] Date of Patent: Mar. 8, 1994

[54] TRANSMISSION ARRANGEMENT FOR VEHICLES

[75] Inventors: Romanus Scholz; Paulus Heidemeyer, both of Wolfsburg; Dag-Arnulf Schlaf, Braunschweig, all of Fed. Rep. of Germany

[73] Assignee: Volkswagen AG, Wolfsburg, Fed. Rep. of Germany

[21] Appl. No.: 985,829

[22] Filed: Dec. 3, 1992

[30] Foreign Application Priority Data

Dec. 16, 1991 [DE] Fed. Rep. of Germany ....... 4141451
Jul. 6, 1992 [DE] Fed. Rep. of Germany ....... 4222115

[51] Int. Cl.$^5$ .......................... F16H 3/78; F16H 3/54; B60K 17/08
[52] U.S. Cl. ................................... 475/231; 475/210; 192/53 F
[58] Field of Search ............... 475/198, 204, 207, 210, 475/212, 213, 331, 332, 338, 341, 342; 192/53 G, 53 F, 67 A

[56] References Cited

U.S. PATENT DOCUMENTS 4,043,226 8/1977 Buuck ................. 475/331 X
4,392,394 7/1983 Hofbauer et al. .......... 475/204

FOREIGN PATENT DOCUMENTS

3330303 11/1991 Fed. Rep. of Germany .
80554 5/1984 Japan ................. 475/210
175666 10/1984 Japan ................. 475/210

*Primary Examiner*—Rodney H. Bonck
*Assistant Examiner*—Khoi Ta
*Attorney, Agent, or Firm*—Brumbaugh, Graves, Donohue & Raymond

[57] ABSTRACT

A transmission arrangement for motor vehicles has a planetary gear set acting as an axle step-up and reversing gear. The planet gears of the planetary gear set have two sets of teeth at different diameters. Synchronizing rings are arranged to minimize the structural space required. A housing for a following differential is connectable either with the planet gear carrier or else with a ring gear meshing with the larger planet gears by way of a sliding sleeve. The transmission has a continuously variable section preceding the planetary gearing.

30 Claims, 9 Drawing Sheets

TRANSMISSION ARRANGEMENT FOR VEHICLES

BACKGROUND OF THE INVENTION

This invention relates to transmission arrangements for vehicles such as motor vehicles having a planetary gear set providing axle step-up and reverse shifting and to drive systems utilizing such transmission arrangements.

German Patent No. 33 30 303 discloses a transmission arrangement in the form of an axle step-up and reverse shifting system having a planetary gear set which includes planet gears provided with two sets of teeth of different diameters. To shift between the two directions of rotation, the transmission arrangement has a first shift position in which a planet gear carrier is connected to a driven gear and the single ring gear of the planetary gear set is connected to a stationary housing. In a second shift position, the ring gear is connected to the driven gear and the planet gear carrier is connected to the housing. This arrangement requires two sliding sleeves and corresponding synchronizing couplings.

SUMMARY OF THE INVENTION

Accordingly, it is an object of the present invention to provide a transmission arrangement of the foregoing type which overcomes the disadvantages of the prior art.

Another object of the invention is to provide a transmission arrangement which requires little space and permits shifting, in particular between two directions of rotation, in as simple a manner as possible.

These and other objects of the invention are attained by providing a transmission arrangement which includes a planetary gear set providing axle step-up and reverse shifting contained in a housing, along with a driven component following the planetary gear set, wherein a planet gear carrier supports planet gears with two different sets of gear teeth of different diameters, one set of planet gear teeth meshing with a stationary first ring gear, another set of planet gear teeth meshing with a second ring gear, and one of the two sets of planet gear teeth also meshing with a sun gear, and wherein either the planet gear carrier or the second ring gear is connectable to the driven component. The driven component is preferably the housing of a differential located coaxial with and following the planetary gear set. The described arrangement shifts only between the second ring gear and the planet gear carrier. The structural space required and the cost of any synchronizing mechanism are correspondingly small.

In a specific embodiment, a drive system according to the invention includes a drive motor such as an internal combustion engine connected to a continuously variable transmission with two principal axes of rotation, such as a cone disk and belt transmission, a starting and disengaging clutch following the transmission, and a transmission arrangement of the type described above, with one of the centers of rotation of the transmission being coaxial with the planetary gearing. The drive system is especially compact in structure and simple in construction.

BRIEF DESCRIPTION OF THE DRAWINGS

Further objects and advantages of the invention will be apparent from a reading of the following description in conjunction with the accompanying drawings, in which:

FIG. 4b is a side view of the sliding sleeve shown in FIG. 4a;

FIG. 7a is a sectional view of an embodiment similar to FIG. 1, but having only one synchronizing ring;

FIG. 7b is a fragmentary view showing the synchronizing ring and sliding sleeve tooth engagement of FIG. 7a;

DESCRIPTION OF PREFERRED EMBODIMENTS

Figure 1:
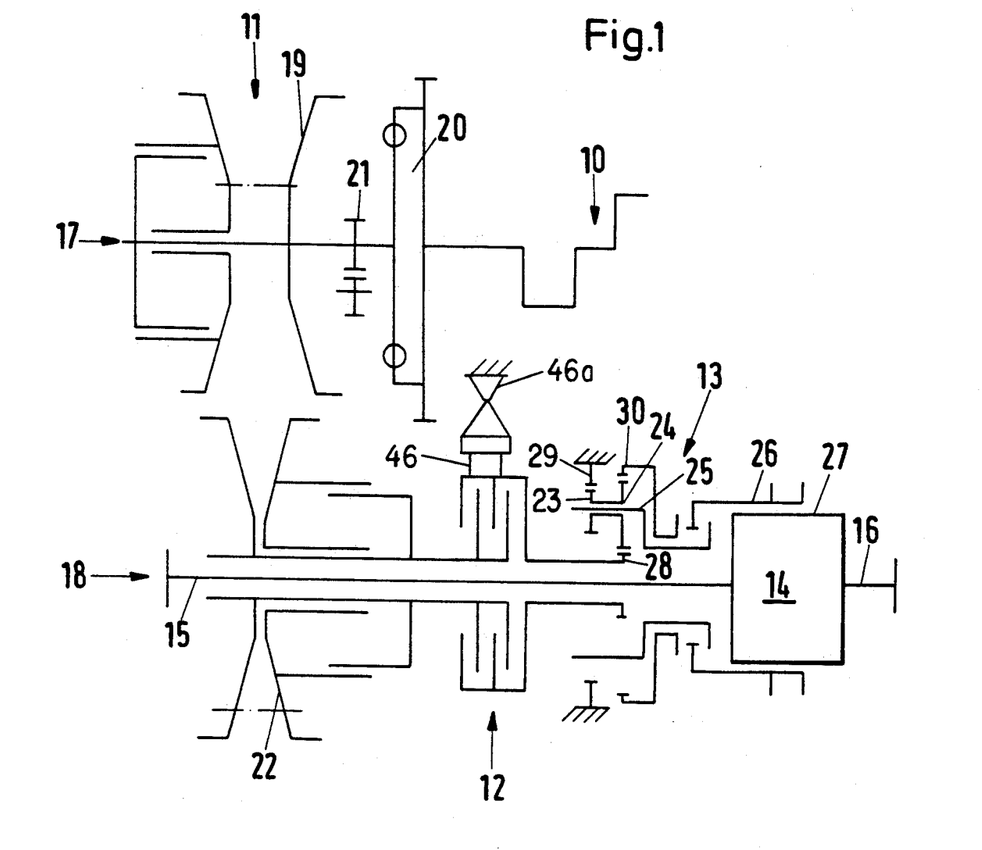
FIG. 1 is a schematic representation showing a typical transmission arrangement according to the invention included as part of a complete drive system.

In the representative embodiment of the invention shown in FIG. 1, a drive system for transmitting torque to the wheels of a motor vehicle according to the invention comprises a motor 10 in the form of an internal combustion engine, a continuous shift transmission consisting of a cone disk and belt transmission 11, a starting and disengagement clutch 12, a planetary gear set 13, a differential 14, and two axle shafts 15 and 16 connected to the differential. The above-mentioned components of the drive system according to the invention have their axes of rotation disposed on either of two parallel axes of rotation 17 and 18.

Between the motor 10 and a set of drive disks 19 for the transmission 11, a rotational vibration damper 20 is preferably connected to the motor 10 and a starter pinion 21 is disposed between the damper and the drive disks 19.

A driven-side cone disk set 22 precedes the clutch 12. The planetary gearing 13 is arranged as an axial step-up and reversing gear, having a planetary gear set in which the planet gears have two sets of teeth 23 and 24 at different diameters. A planet gear carrier 25 is connectable by way of a sliding sleeve 26 to a housing 27 for the differential 14. The driven-side cone disk set 22, the clutch 12, the planetary gear set 13, the sliding sleeve 26, the differential 14 and the axle shafts 15 and 16 are mounted coaxial to each other on the axis of rotation 18.

The planetary gear set 13 also includes a sun gear 28, a stationary ring gear 29 connected to the housing for the planetary gear set, and an additional ring gear 30. The latter is connectable by the sliding sleeve 26 or to the differential housing 27.

By selective action of the sliding sleeve 26, the direction of rotation at the output of the planetary gear set 13 is reversed. For this purpose, the set of planet gear teeth 23 which engage the stationary ring gear 29 has a smaller diameter than the set of planet gear teeth 24 which engage the ring gear 30. The sun gear 28 meshes with the larger-diameter set of planet gear teeth 24. The following numbers of teeth for the components of the planetary gear set 13 are set forth as a preferred example:

| Sun gear 28 | 24 teeth |
|---|---|
| Large-diameter set of planet gear teeth 24 | 30 teeth |
| Large ring gear 30 | 84 teeth |
| Small-diameter set of planet gear teeth 23 | 18 teeth |
| Small ring gear 29 fixed relative to the housing | 72 teeth |

Thus, the two sets of planet gear teeth 23 and 24 and the ring gears 29 and 30, respectively, have numbers of teeth in the proportions of 3:5 and 6:7, respectively. The large ring gear 30 represents the output of the planetary gear set for driving in reverse, while the planet gear carrier 25 is connectable with the housing 27 by way of the sliding sleeve 26 for forward driving.

Figure 2:
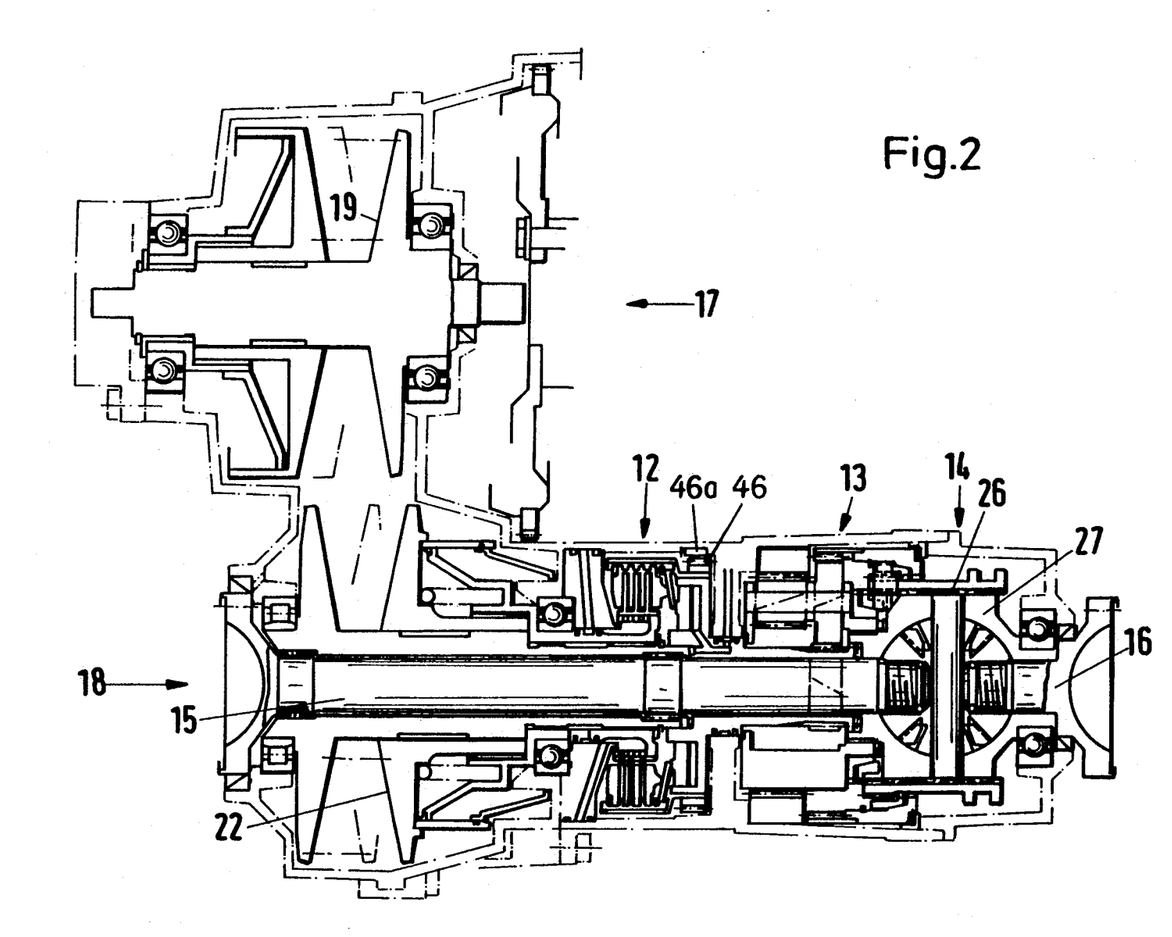
FIG. 2 is a sectional view showing the transmission arrangement depicted schematically in FIG. 1.

The essential components of the drive system according to the invention are shown in FIG. 2 in the form of a simplified design layout by contrast with the schematic illustration of FIG. 1. Identical parts are designated with the same reference numerals in the several figures.

Figures 3A, 3B:
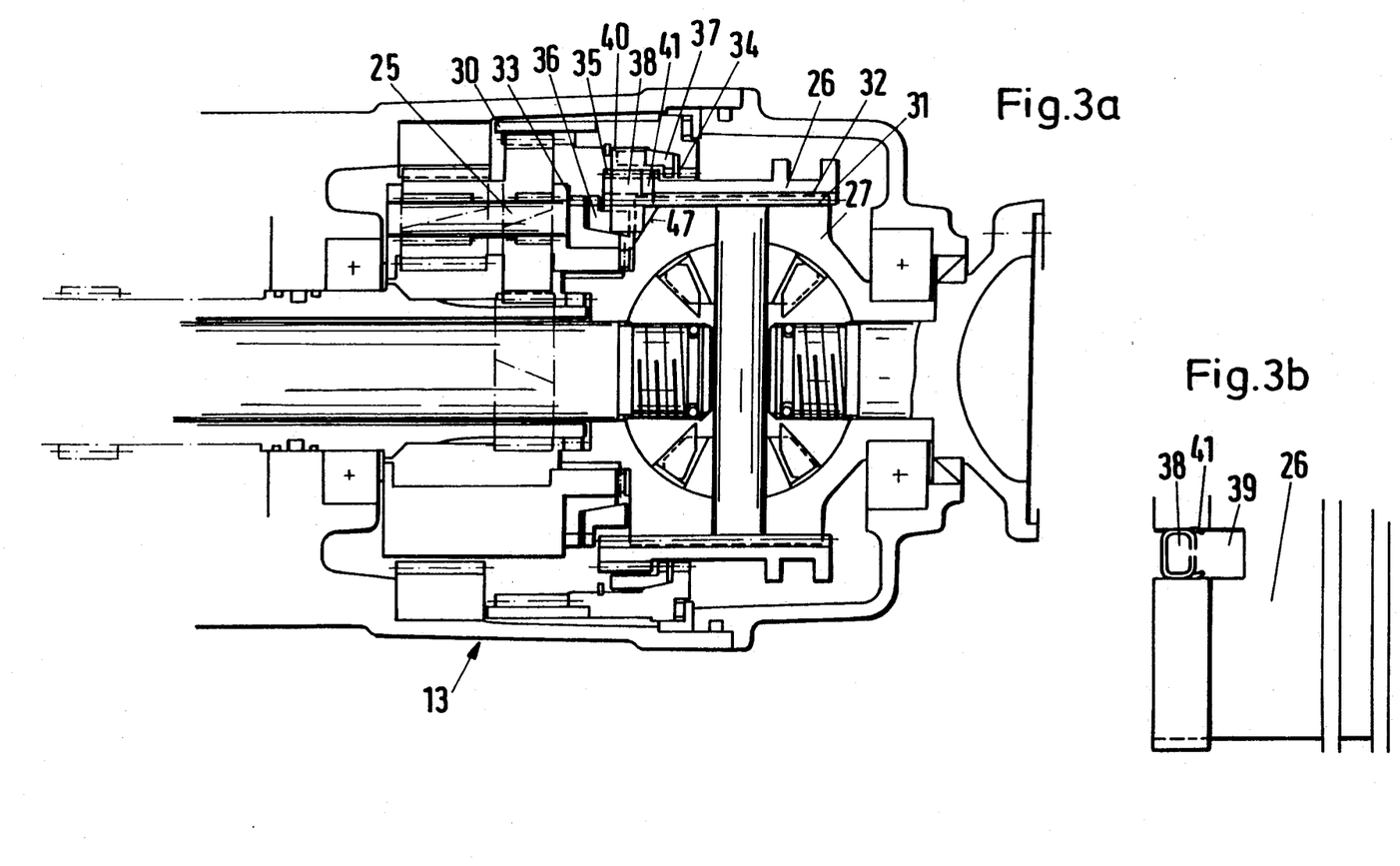
FIG. 3a is a sectional view showing a portion of the transmission illustrated in FIG. 2.
FIG. 3b is a fragmentary top view of the portion shown in FIG. 3a illustrating a sliding sleeve with a synchronizing lock.

FIG. 3a shows a portion of the transmission of FIG. 2, namely, the planetary gearing 13 with the differential 14, to a somewhat larger scale. In addition, the tooth engagements between the several components are identified. Thus, the sliding sleeve 26 is rotationally fixed but is axially displaceable on the housing 27 by way of internal splines 31 which slidably engage external splines 32 on the housing. Analogously, the planet gear carrier 25 and the larger ring gear 30 are formed with external teeth 33 and internal teeth 34, respectively. These come into engagement with the internal splines 31 and with external teeth 35 on the sliding sleeve 26, respectively.

Two synchronizing rings 36 and 37, axially spaced from the external teeth 33 and the internal teeth 34, respectively, are provided with matching teeth having conical contact surfaces to adapt to differing rotational speeds between the synchronizing rings 36 and 37 and the planet gear carrier 25 and the ring gear 30, respectively. An engaging pressure is applied to the synchronizing rings 36 and 37 by a plurality of synchronizing locks 38 and, as a result, a preliminary adaptation of the rotational speed of the housing 27 to that of the planet gear carrier 25 and the ring gear 30, respectively, is effected. The function of the synchronizing rings 36 and 37 corresponds essentially to that of the known so-called Borg-Warner system, with the following differences.

Figure 4A:
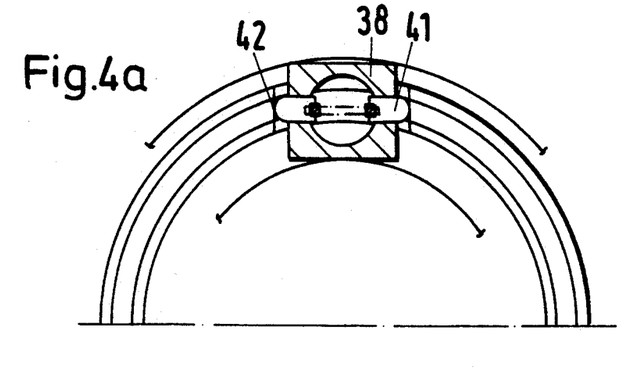
FIG. 4a is an end view showing a sliding sleeve with a synchronizing lock.
Figure 4B:
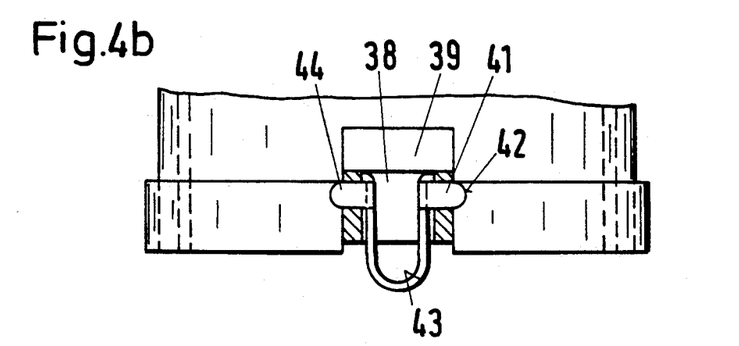

Preferably, three synchronizing locks 38, one of which is shown in FIG. 3b, are arranged around the circumference of the sliding sleeve 26 in radially directed grooves 39 in the sleeve. To shift the planet gear carrier 25, the sliding sleeve 26 and with it the synchronizing locks 38 are urged against the synchronizing ring 36. At this point, the end surfaces of the synchronizing locks 38 facing the planet gear set engage an expansion ring 40 mounted on the inner surface of the ring gear 30, preventing any tilt of the sleeve 26. Analogously, when shifting the ring gear 30 and urging the synchronizing ring 37 into engagement, an inner portion of the synchronizing lock 38 engages a recess 47 in the housing 27. As shown in FIGS. 4a and 4b, the synchronizing lock 38 comprises spring members held in corresponding recesses 42 in the circumferential direction in the groove 39. During a shifting operation, when a synchronous condition is attained, the spring members 41 are pressed towards each other so that the sliding sleeve 26 can be shifted relative to the synchronizing lock 38 by engagement of teeth on the corresponding synchronizing ring 36 or 37 with the teeth 33 or 34 as required.

In the representative form shown in FIG. 3b, the synchronizing lock 38 is a spring sheet steel part having sheet-metal tabs arranged on either side in the circumferential direction to serve as spring members 41.

Figure 5:
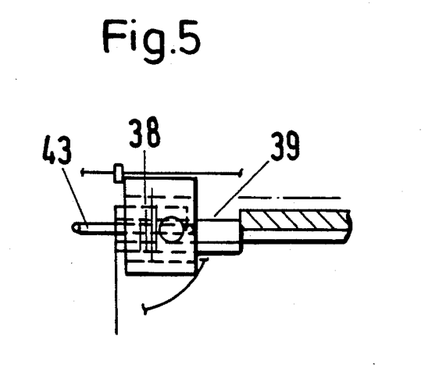
FIG. 5 is a side view of the synchronizing lock shown in FIGS. 4a and 4b.
Figure 6:
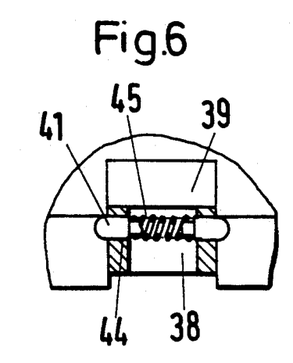
FIG. 6 is a sectional view showing another representative embodiment of a synchronizing lock.

Other embodiments of the synchronizing lock 38 are shown in a somewhat different scale in FIGS. 4a to 6. In this case, the spring members 41 are in the form of pins which are resiliently movable in the circumferential direction. In FIGS. 4a, 4b and 5, the pins are urged apart by a prestressed, U-shaped spring 43. The synchronizing lock 38 has an axial recess to accommodate the spring 43. In addition, two openings 44, facing each other in the circumferential direction, are provided to receive the pins or spring members 41. FIG. 6 shows another modification of the synchronizing lock 38. In that embodiment, instead of the spring 43, a coiled compression spring 45 is provided to act on the spring members 41, which have the same configuration as in the previous embodiments.

A special advantage of the arrangement described above is that the shifting and synchronizing mechanism, i.e., the sliding sleeve 26, the synchronizing rings 36 and 37, and the synchronizing lock 38, occupy no additional space either radially or axially. Instead, an inherently empty space between the planetary gear set 13 and the differential 14 is utilized for this purpose.

FIG. 2 shows still another feature. Here, teeth 46 are provided on the outer, driven-side portion of the disengaging and starting clutch 12 to cooperate as a parking lock with a claw (not shown) arranged in a conventional manner on the housing for the planetary gear set 13. Upon engagement of the parking lock, there will always be a connection by way of the sliding sleeve 26 to the driven components, preferably with the ring gear 30 as the reverse gear, thereby providing lower stresses acting on the teeth 46 because of the greater transmission ratio.

Figures 7A, 7B:
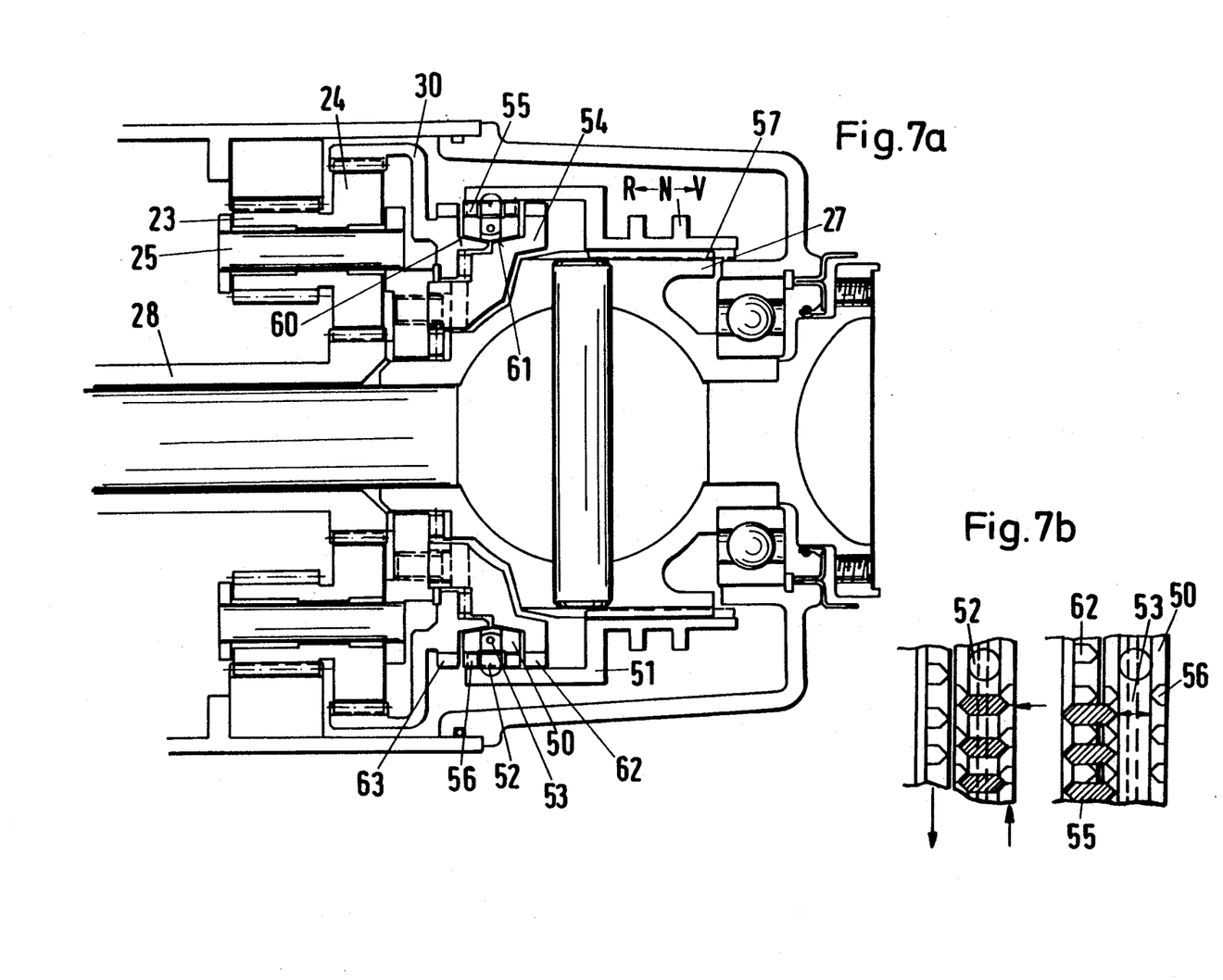
Figure 8:
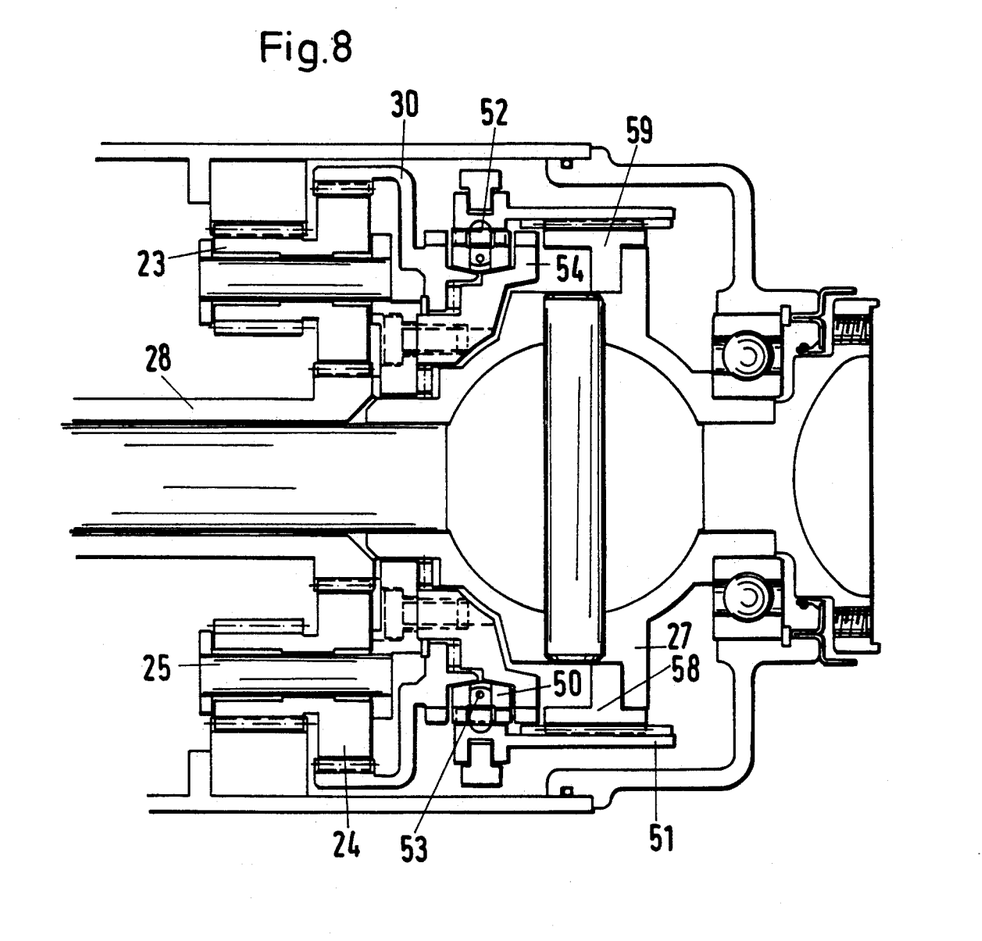
FIG. 8 is a sectional view illustrating another modified embodiment of a transmission arrangement similar to FIG. 7a with a separate tooth engagement ring for the sliding sleeve.
Figure 9:
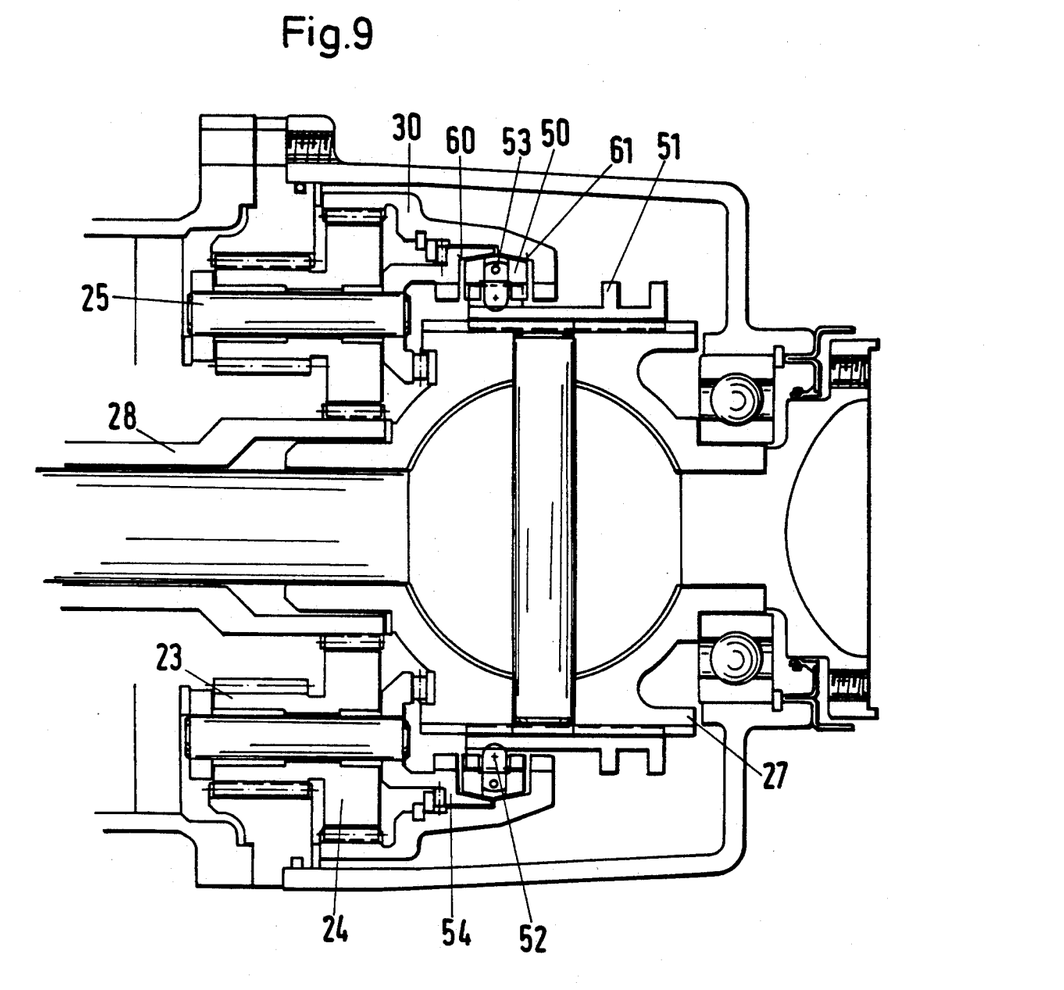
FIG. 9 is a sectional view illustrating still another modification of a transmission similar to that of FIG. 7a, but with internal shift tooth engagement.

Additional refinements of the invention are illustrated in FIGS. 7-9, in which the transmission arrangement according to the invention eliminates the synchronizing locks and all but one synchronizing ring. To that end, as shown in the typical embodiment illustrated in FIGS. 7a and 7b, a sliding sleeve 51 has internal teeth 55 connectable with the teeth of a single synchronizing ring 50. The synchronizing ring 50 is connected to a pin 52 which is biased outwardly by a preferably annular wire spring 53, to provide a neutral position N for the synchronizing ring. For this purpose, the synchronizing ring 50 has a double conical inner surface, one conical part of which engages and is substantially axially displaceable on a conical surface 60 of the ring gear 30, while the other conical part of the inner surface of the ring 50 engages and is substantially axially movable on a conical surface 61 of a forward gear element 54 connected to the planet gear carrier 25.

To engage a forward gear, the synchronizing ring 50 is moved out of the neutral position N toward a forward position V by the sliding sleeve 51 by way of the pin 52 which is biased outwardly by the annular wire spring 53. This motion continues initially until the conical surface of the synchronizing ring 50 engages the conical surface 61 of the forward gear element 54. If there is a relative displacement between the differential and the forward gear element 54, the sloped faces of the internal teeth 55 of the sliding sleeve 51 will engage the sloped faces of the teeth 56 of the synchronizing ring 50 as shown in FIG. 7b. This produces a synchronizing torque until identical rotational speeds of the sliding sleeve 51 and the forward gear element 54 are attained, thus avoiding engagement before the synchronous speed is reached. Once the synchronous speed is reached, of course, the teeth 55 on the sliding sleeve 51 can engage corresponding external teeth 62 of the forward gear element 54 as shown in FIG. 7b.

To shift into reverse, the synchronizing ring 50 is moved by the sliding sleeve 51 from the neutral position N in the direction of reverse R to engage its other conical surface with the conical surface 60 of the ring gear 30. This permits displacement of the teeth 55 of the sliding sleeve 51 into corresponding external teeth 63 (FIG. 7a) of the ring gear 30 upon attainment of synchronous rotational speed.

In the particular embodiment shown in FIG. 7a, splines 57 formed in the sliding sleeve 51 slidingly engage corresponding splines in the surface of the differential housing 27. Alternatively, however, these splines may be formed in a separate wear-resistant part. This is illustrated in FIG. 8 as a splined ring 59 fixedly mounted on the housing 27.

FIG. 9 shows another embodiment of the invention in which the synchronizing ring 50 is located inside a ring formed by the conical surface 61 of the ring gear 30 and the conical surface 60 of the forward gear element 54. The result is a very compact construction with parts which are simple to fabricate.

Figure 10:
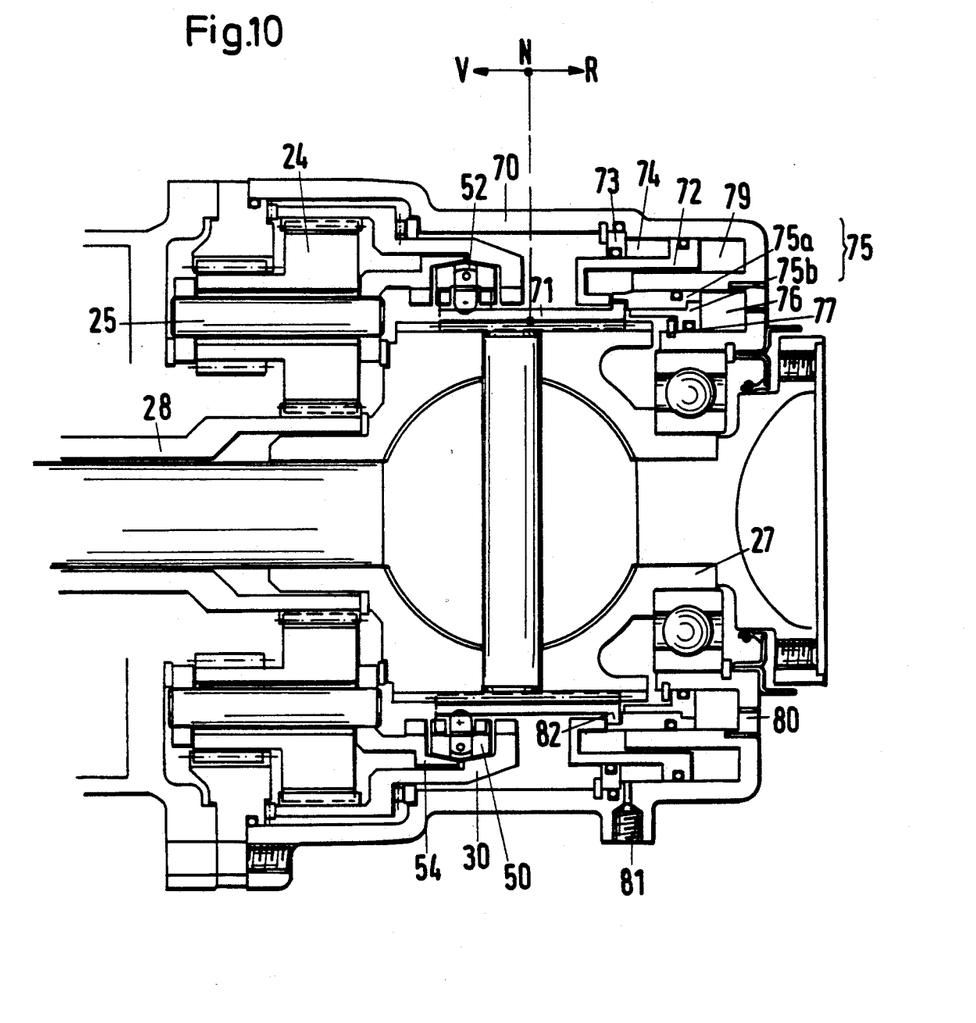
FIG. 10 is a sectional view showing a refinement of the arrangement shown in FIG. 9 with a hydraulic mechanism for actuating the sliding sleeve.
Figure 11:
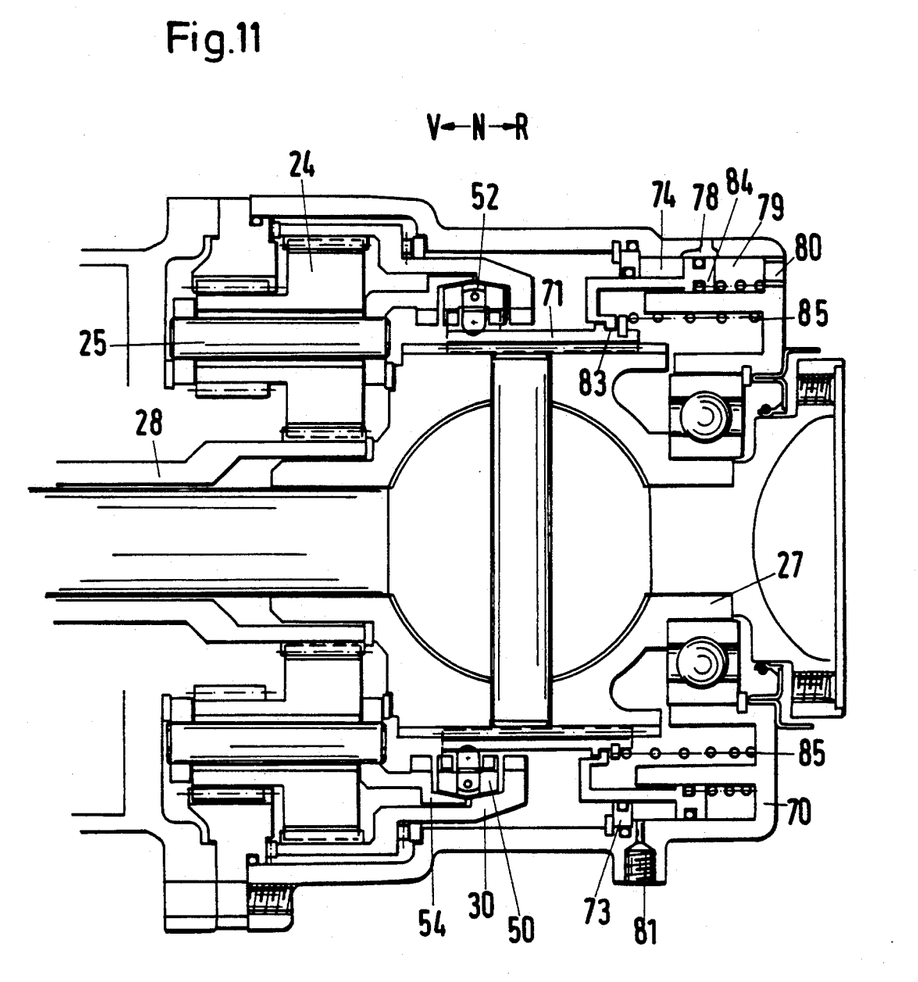
FIG. 11 is a sectional view showing another embodiment of a transmission similar to that of FIG. 10 having a double-acting hydraulic piston.

Another refinement of the invention is illustrated in FIGS. 10 and 11. Whereas in the transmission devices thus far described the sliding sleeve 26 or 51 is actuated by a shifting fork (not shown), controlled by an external hydraulic unit or connected to a hand lever, the embodiments of FIGS. 10 and 11 provide a hydraulic mechanism accommodated in the transmission housing for actuating a sliding sleeve 71. In FIG. 10, a piston-and-cylinder arrangement having two pressure chambers 74 and 76 and three pistons 72, 75a and 75b is provided in a transmission housing 70 for this purpose. The chambers 74 and 76 are formed by the pistons 72, 75a and 75b, the inside wall of the housing 70, and a sealing element 73, and are supplied with hydraulic fluid from a pump (not shown) through switch valves by way of two lines 80 and 81.

To actuate the sliding sleeve 71, the side of a stop 82, formed on the sleeve 71, which faces the planet gears 24 is acted upon by the piston 72 of the first piston-and-cylinder unit. The side of the stop 82 facing away from the planet gears 24 is subjected to pressure by the pistons 75a and 75b of the second piston-and-cylinder unit.

In the neutral position N, the sliding sleeve 71 is held at the required location because the pressure chamber 74 formed by the housing 70, the piston 72 and the sealing element 73, and the pressure chamber 76 enclosed by the housing 70 and the stepped pistons 75a and 75b, are subjected to the same hydraulic pressure. Since the effective hydraulic area of the piston 72 is greater than the area of the piston 75a, but smaller than that of the pistons 75a and 75b combined, the neutral position is determined by a stop 77 which may be an expansion ring. The sliding sleeve 71 is shifted by the piston 75a to the forward position V by relieving the pressure in the chamber 74 until the piston 72 touches the sealing element 73. In the reverse position R, the chamber 74 is under pressure, while no pressure is applied to the chamber 76. The limit on travel of the sleeve 71 is provided by contact of the pistons 75a and 75b with the housing 70.

In another arrangement, a third pressure chamber 79, formed by the piston 72 and the housing 70, is used to actuate the forward gear. This has the advantage that the double piston 75a and 75b can be integrated in one piston 75.

The sleeve 71 is maintained in the neutral position even after the motor is shut off, that is, when the transmission oil pump is no longer generating any hydraulic pressure, by a mechanical stop, for example, a spring-loaded ball (not shown) between the sliding sleeve 71 and the differential housing. In the transmission of FIG. 10, this function is performed by the spring-loaded pin 52 mounted on the synchronizing ring 50.

FIG. 11 shows a modification having a double-acting shift piston 84. In the reverse setting R the chamber 74 is under elevated oil pressure and in the forward setting V the chamber 79 is under pressure, so that the piston 72 displaces the sliding sleeve 71 to the left or right appropriately. The neutral setting N is established by applying equal oil pressure to the chambers 74 and 77 and permitting escape of hydraulic oil through an opening 78 when the motor is running, as well as by the mechanical stop described above when the motor is turned off. Shifting out of the neutral position N is possible only after the opening 78 is closed by a control piston (not shown) which may be actuated by a shift lever (not shown).

The transmission arrangements shown in FIGS. 7-11 include a device, not shown completely, which ensures that the dynamic link between the parking lock 46 and the axle housing 27 is not interrupted in the park position P of the shift lever setting even when the motor is shut off. As shown in FIG. 11, this device may, for example, be a spring 85 provided in the piston chamber 79. The spring 85 may also be provided in the piston chamber 74 or in the transmission chamber abutting on the inside wall of the housing 70 so as to exert a force on the sliding sleeve 71.

This piston 84 may be dispensed with if the shifting devices of FIGS. 7-11 are arranged solely for the terminal positions of the forward and the reverse gear, and the interruption of the dynamic link in the shift lever settings N-neutral and P-park is provided exclusively by the disengaged clutch 12.

Although the invention has been described herein with reference to specific embodiments, many modifications and variations therein will readily occur to those skilled in the art. Accordingly, all such variations and modifications are included within the intended scope of the invention.

We claim:

1. A transmission arrangement for vehicles comprising a housing, a planetary gear set contained in the housing including an axle step-up and reversing gear and a driven component following the planetary gear set, wherein the planetary gear set includes a planet gear carrier carrying planet gears having sets of gear teeth with different diameters and wherein one set of planet gear teeth engages a stationary first ring gear, another set of planet gear teeth engages a second ring gear, and one of the two sets of planet gear teeth engages a sun gear, and wherein either the planet gear carrier or the second ring gear is connectable to the driven component.

2. A transmission according to claim 1 wherein the set of planet gear teeth engaging the sun gear has a greater diameter than the other set of planet gear teeth.

3. A transmission according to claim 1 wherein the set of planet gear teeth engaging the stationary first ring gear has a smaller diameter than the other set of planet gear teeth.

4. A transmission according to claim 1 wherein the numbers of teeth in the sets of planet gear teeth are in the ratio of 3:5.

5. A transmission according to claim 1 wherein the number of teeth in the first and second ring gears are in the ratio of 6:7.

6. A transmission according to claim 1 including an axially displaceable sliding sleeve arranged to establish a connection between either the planet gear carrier or the second ring gear and the driven component.

7. A transmission according to claim 6 wherein the sliding sleeve is held in angularly fixed relation to the driven components by splines.

8. A transmission according to claim 6 wherein the sliding sleeve has internal gear teeth connectable to outer teeth on the planet gear carrier.

9. A transmission according to claim 6 wherein the sliding sleeve has external gear teeth connectable to inner teeth on the second ring gear.

10. A transmission according to claim 6 including at least one synchronizing ring, a plurality of synchronizing locks arranged in grooves in the sliding sleeve, and means for urging the synchronizing ring toward a rotatable transmission component to synchronize the sliding sleeve with the rotatable transmission component.

11. A transmission according to claim 10 wherein the synchronizing locks are arranged in radially directed grooves in the sliding sleeve.

12. A transmission according to claim 10 wherein the synchronizing locks are spring-biased in the circumferential direction of the sleeve.

13. A transmission according to claim 10 wherein the synchronizing locks comprise spring members which project beyond the contours of the locks and are capable of being moved by springs into the synchronizing locks.

14. A transmission according to claim 11 wherein the grooves are formed with recesses directed in the circumferential direction of the sliding sleeve to accommodate correspondingly configured spring members of the synchronizing locks.

15. A transmission according to claim 10 wherein the synchronizing locks are hollow in configuration and the spring members comprise spring-biased pins arranged in diametrally opposed apertures.

16. A transmission according to claim 10 wherein the synchronizing locks comprise sheet spring steel parts having tabs capable of being moved inwardly against spring bias.

17. A transmission according to claim 10 wherein the synchronizing locks are arranged to engage a stop adjacent to a neighboring ring gear when a synchronizing ring for the planet gear carrier is urged into engagement.

18. A transmission according to claim 10 wherein the synchronizing locks engage an abutment on the driven component adjacent to the sliding sleeve when a synchronizing ring for a ring gear is urged into engagement.

19. A transmission according to claim 1 wherein the driven component is the housing of a following differential.

20. A transmission according to claim 1 including a starting and disengaging clutch preceding the planetary gear set and having means to cooperate with means on the housing for the planetary gear set to provide a parking lock.

21. A transmission according to claim 10 including a selected synchronizing ring having at least one spring-biased pin and wherein the sliding sleeve has internal teeth connectable to teeth on that synchronizing ring.

22. A transmission according to claim 21 wherein the selected synchronizing ring has an interior double conical surface with one conical surface engaging a conical surface of the ring gear which has external teeth and the other conical surface engaging the conical surface of a forward gear element which is connected to the planet gear carrier and has external teeth.

23. A transmission according to claim 21 wherein the sliding sleeve has splines which are axially displaceable on a separate displacement ring surrounding the driven component.

24. A transmission according to claim 21 wherein the synchronizing ring is disposed inside a ring formed by a conical surface of the ring gear and the conical surface of a forward gear element.

25. A transmission according to claim 21 including a stop formed on the sliding sleeve wherein one side of the stop facing the planet gear set is acted upon by a piston of a first piston-and-cylinder unit, and another side of the stop facing away from the planet gear set is acted upon by at least one piston of a second piston-and-cylinder unit.

26. A transmission according to claim 25 wherein the pressure chambers of the two piston-and-cylinder units are formed by the pistons, a sealing element fixed to a transmission housing, and by the transmission housing itself, and are capable of being supplied through feed lines with hydraulic fluid.

27. A transmission according to claim 25 wherein the first piston-and-cylinder unit has two pressure chambers subdivided by a piston movable therein, and the second piston-and-cylinder unit has a single piston.

28. A transmission according to claim 21 wherein the sliding sleeve is formed with a guide groove and including a piston-and-cylinder unit having a piston with one end engaging the groove and the other end arranged between two pressure chambers, and wherein the two pressure chambers are formed by the piston, the transmission housing and a sealing element, and the pressure chambers can be emptied by way of a common drain hole in the housing and the piston has a portion acting as a control slide for the drain hole inside the pressure chambers.

29. A transmission according to claim 21 including biasing means on the sliding sleeve abutting against the inside wall of the transmission housing and exerting a force on the sliding sleeve.

30. A drive system for a vehicle comprising a drive motor, a continuously variable transmission following the motor and having components with two principal axes of rotation and comprising a housing, a planetary gear set contained in the housing including an axle step-up and reversing gear and a driven component following the planetary gear set, wherein the planetary gear set includes a planet gear carrier carrying planet gears having sets of gear teeth with different diameters and wherein one set of planet gear teeth engages a stationary first ring gear, another set of planet gear teeth engages a second ring gear, and one of the two sets of planet gear teeth engages a sun gear, and wherein either the planet gear carrier or the second ring gear is connectable to the driven component, and including a starting and disengaging clutch following the transmission, wherein one of the centers of rotation of the variable transmission is coaxial with the axis of the planetary gear set.

* * * * *